US012654145B1

(12) United States Patent
Cota et al.

(10) Patent No.: US 12,654,145 B1
(45) Date of Patent: Jun. 16, 2026

(54) FILLING DEVICE FOR DENSE LOADING OF A CHEMICAL REACTOR

(71) Applicant: T.I.M.E. Service Catalyst Handling GmbH, Manching (DE)

(72) Inventors: Anna Cota, Manching (DE); Robert Frickel, Manching (DE)

(73) Assignee: T.I.M.E. Service Catalyst Handling GmbH, Manching (DE)

( * ) Notice: Subject to any disclaimer, the term of this patent is extended or adjusted under 35 U.S.C. 154(b) by 0 days.

(21) Appl. No.: 19/234,781

(22) Filed: Jun. 11, 2025

Related U.S. Application Data

(60) Provisional application No. 63/786,473, filed on Apr. 10, 2025.

(51) Int. Cl.
B01J 8/00 (2006.01)

(52) U.S. Cl.
CPC ...... B01J 8/002 (2013.01); *B01J 2208/00752* (2013.01)

(58) Field of Classification Search
CPC .. B01J 8/002; B01J 8/003; B01J 2208/00752; B01J 2208/00769; B01J 2208/00778
See application file for complete search history.

(56) References Cited

U.S. PATENT DOCUMENTS

| | | | |
|---|---|---|---|
| 4,972,884 | A | 11/1990 | Souers |
| 5,687,780 | A | 11/1997 | Minami |
| 2013/0298507 | A1 | 11/2013 | Poussin |
| 2020/0290828 | A1* | 9/2020 | Cota ................. B65G 69/0441 |

FOREIGN PATENT DOCUMENTS

| | | |
|---|---|---|
| JP | 02014732 A | 1/1990 |
| WO | 2017167957 A1 | 10/2017 |

* cited by examiner

*Primary Examiner* — Lessanework Seifu
(74) *Attorney, Agent, or Firm* — Saul Ewing LLP; Brian R. Landry; Ian Mahany-Horton

(57) ABSTRACT

The invention relates to a filling device for dense loading of a chemical reactor with particulate catalyst material. In particular, it relates to a device for even distribution of the catalyst material by centrifugal force. Furthermore, the invention relates to novel distribution devices, and a method for dense loading of a chemical reactor using a filling device described herein.

29 Claims, 6 Drawing Sheets

FILLING DEVICE FOR DENSE LOADING OF A CHEMICAL REACTOR

CROSS-REFERENCE TO RELATED APPLICATION

Figure 1:
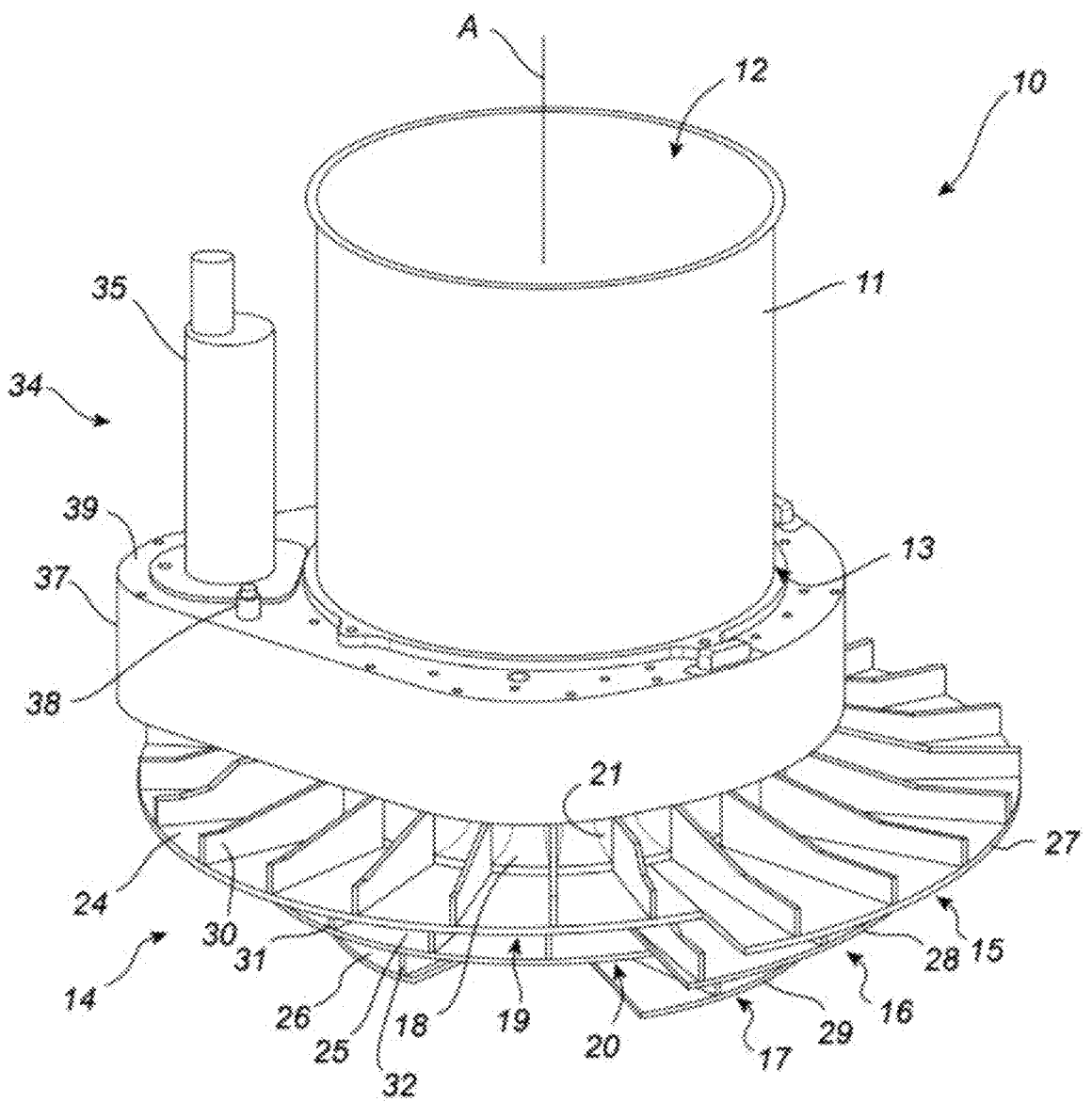

This application claims the benefit of priority to U.S. Provisional Patent Application Ser. No. 63/786,473, filed Apr. 10, 2025, and European Patent Application No. 25169809.8, filed Apr. 10, 2025.

TECHNICAL FIELD

The invention relates to a filling device for dense loading of a chemical rector with particulate catalyst material. In particular, it relates to a device for evenly distributing the catalyst material by centrifugal force. Furthermore, the invention relates to novel distribution devices, and a method for dense loading of a chemical reactor using a filling device described herein.

PRIOR ART

When filling chemical reactors with catalyst material, it is necessary to ensure an even density distribution in order to guarantee optimum reaction control. However, known filling devices are prone to uneven distribution, which leads to undesirable flow effects and local density fluctuations. This can negatively influence the efficiency and service life of the catalyst layer.

Previous solution approaches comprise various mechanical and pneumatic methods for particulate distribution, but these are often complex, maintenance-intensive or inadequate in terms of their distribution performance.

In the international patent application WO 2017/167957 A1 by the applicant, a filling device for dense loading of a chemical reactor is described, which describes a feed hopper for particulate catalyst material and a distribution device arranged rotatably under the feed hopper, in which a drive device for the distribution device is arranged outside the feed hopper, such that damage to the catalyst material by the drive device is avoided.

OBJECT OF THE INVENTION

The object of the present invention is to further improve the filling device described in WO 2017/167957 A1 with regard to a gentle and uniform filling of a reactor with particulate catalyst material.

SUMMARY OF THE INVENTION

The invention relates to a filling device for dense loading of a chemical reactor with particulate catalyst material, comprising a central, substantially radially symmetrical feed hopper for particulate catalyst material with an upper inlet opening and a lower outlet opening; a distribution device that is arranged for distributing the particulate catalyst material in the chemical reactor by centrifugal force rotatably around a vertical rotation axis (A) below the feed hopper, wherein the distribution device comprises at least one first annular distribution element that has an upper, annular, substantially horizontal inlet opening with a clear width (w), a substantially vertical outlet opening which is directed radially outwards with respect to the rotation axis (A) and has a clear height (h), and a deflection element arranged between the inlet opening and the outlet opening, wherein the deflection element deflects a substantially vertical particle flow coming from the feed hopper into a substantially horizontal particle flow; a drive bearing arranged radially symmetrically to the rotation axis (A), which has a fixed bearing ring connected directly or indirectly to the feed hopper, in particular an outer fixed bearing ring, and a rotating bearing ring connected to the distribution device, in particular an inner rotating bearing ring; and a drive mechanism which has a drive motor and belt drive arranged laterally offset to the vertical rotation axis (A) outside the feed hopper, wherein the drive motor drives the rotating bearing ring of the drive bearing via the belt drive.

According to a first embodiment of the invention, the filling device according to the invention is characterised in that the clear height (h) of the outlet opening is greater than the clear width (w) of the inlet opening, and the deflection element has a guide surface which has a substantially vertical tangent (t1) at the inlet opening and a substantially horizontal tangent (t2) at the outlet opening, where the radius of curvature of the guide surface increases continuously from the inlet opening to the outlet opening.

According to a second embodiment of the invention, the filling device according to the invention is characterised in that the drive bearing is arranged within a rotating bearing housing which can be supplied with a purge gas flow.

According to a third embodiment of the invention, the filling device according to the invention is characterised in that the lower end of the feed hopper has at least one annular insert which feeds the particle flow to the at least one distribution element.

In further variants of the invention, the features of the first and second embodiment, the first and third embodiment, the second and third embodiment or all three embodiments can be combined with one another.

Moreover, the invention relates to a distribution device which can be used in a filling device. The distributing device comprises at least one first, annular distribution element which has an upper, annular, substantially horizontal inlet opening with a clear width (w), a substantially vertical outlet opening with a clear height (h) directed radially outwards with respect to the rotation axis (A) and a deflection element arranged between the inlet opening and the outlet opening, wherein the deflection element deflects a substantially vertical particle flow coming from the feed hopper into a substantially horizontal particle flow; wherein the clear height (h) of the outlet opening is greater than the clear width (w) of the inlet opening, and the deflection element has a guide surface which has a substantially vertical tangent (t1) at the inlet opening and a substantially horizontal tangent (t2) at the outlet opening, where the radius of curvature of the guide surface increases continuously from the inlet opening to the outlet opening. The distribution device according to the invention can be formed corresponding to the features described above.

Finally, the invention also relates to a method for dense loading of a chemical reactor with particulate catalyst material in which the filling device according to the invention is used.

DETAILED DESCRIPTION OF THE INVENTION

Accordingly, according to the first embodiment of the invention, the present invention provides an improved filling device for dense loading of a chemical reactor with particulate catalyst material, in which a particularly gentle, uniform and efficient filling of the reactor can be achieved by a novel design of the distribution device. In particular, the design of the annular distribution element with a specifically moulded guide surface can achieve significant technical advantages over the prior art:

The annular distribution element has a guide surface that deflects a substantially vertical particle flow, as it emerges from the feed hopper, into a substantially horizontal particle flow directed in the direction of the reactor inner wall. By continuously increasing the radius of curvature of this guide surface, the deflection of the particle flow is carried out particularly gently and evenly. This significantly reduces mechanical loads on the catalyst particles, which are highly sensitive to mechanical load, and prevents particle abrasion or breakage. This contributes substantially to maintaining the structural integrity of the catalyst material.

By forming the inlet opening as an annular, substantially horizontal opening with a smaller clear width compared to the outlet opening results in a flow pattern that supports a targeted and controlled transport of the particles along the guide surface, which promotes an even distribution of the particles across the reactor cross-section and avoids local inhomogeneities, in particular "hotspots".

The fact that the clear height of the outlet opening is greater than the clear width of the inlet opening creates an effective cross-section for ejecting the particles, which enables a higher particle flow at a simultaneously lower flow speed. This reduces the energy input into the particles and increases the material throughput while at the same time reducing the mechanical load on the particles.

As already in WO 2017/167957 A1, the laterally offset drive device outside the feed hopper avoids the danger of particle damage due to collision with central drive elements and allows the filling product to flow freely through the feed hopper. In addition, the maximum filling volume in the feed region is not restricted by drive components mounted in the feed hopper.

The even distribution of the catalyst material in the reactor leads to a homogeneous bulk density, which has a direct positive effect on the reactor performance, for example through even temperature distribution, low pressure loss and more defined reaction kinetics. The invention thus decisively contributes to the process stability and efficiency of chemical reactors filled according to the invention.

In the context of this application, the terms "up" and "down" refer to the orientation of the device in the intended operating state, in which the direction of gravity serves as a reference.

Here, "down" refers to the direction in which the gravitational force acts, while "up" defines the opposite direction.

The terms "substantially vertical" and "substantially horizontal" in the context of this application mean that the angular deviations from the vertical or horizontal are less than 20°, preferably less than 10° and particularly preferably less than 5°.

In the sense of the present invention, the term "feed hopper" is understood to be a component of the filling device which receives particulate catalyst material prior to distribution in the reactor and is lowered into the reactor to be filled as part of the filling device. Typically, the feed hopper is a container that is radially symmetrical around the rotation axis (A), in particular a cylindrical container with a cylindrical side wall, a lower outlet opening that is arranged immediately above the distribution device, and an upper inlet opening through which material can be filled in or fed. The upper inlet opening can form the upper end-face lid area of the cylindrical feed hopper or can also be arranged in the upper part of the cylindrical side wall of the feed hopper. Typically, the feed hopper serves as an intermediate container and is connected via a feed hose to a supply container for catalyst material located outside the reactor.

The "distribution device" is arranged below the feed hopper so that it can rotate around the central rotation axis (A), such that particulate material enters the annular distribution elements of the distribution device under the effect of gravitational force and is ejected radially outwards into the reactor interior by centrifugal force when the distribution device rotates. The flow rate of catalyst material is determined by various parameters, substantially the dimensions of the lower outlet opening of the feed hopper, the upper inlet openings of the distribution elements, the vertical outlet openings of the distribution elements, the bulk height of the catalyst material in the feed hopper and the rotational speed of the distribution device. In addition, adjustable flow control means can also be provided between the feed hopper and the distribution device, for example diaphragms with variable opening width, as described in the international patent application WO 2017/167957 A. As described in more detail below, the flow control means can also be formed as annular diaphragms that can be easily replaced by insertion.

As in the international patent application WO 2017/167957 A, the "drive device" in the filling device according to the invention is also arranged laterally offset to the vertical rotation axis (A) outside the feed hopper and drives the distribution device via a drive bearing by means of a belt drive. Such a belt drive has proved to be particularly reliable compared to other drive variants in the dusty environment of a chemical reactor. The belt drive can comprise a drive wheel and a drive belt. The drive wheel formed at the lower end of the drive motor is set in rotation by the drive motor and the rotary movement of the drive wheel is transmitted by the drive belt to the rotating bearing ring of the drive bearing. The drive motor is in particular a pneumatic bidirectional high-performance motor which, due to its slim design, does not increase the overall radial diameter of the filling device, as already described in WO 2017/167957 A.

According to the invention, it is provided that the vertical clear height of the outlet opening of the distribution element is greater than the horizontal clear width of the inlet opening. Since at least one of the distribution elements is formed to be annular, the horizontal inlet opening also forms a ring and the clear width of the inlet opening thus corresponds to the thickness of the ring.

According to the invention, the deflection element, which deflects the particle flow from a vertical flow direction into a horizontal ejection direction, has a guide surface which has a substantially vertical tangent at the inlet opening, which corresponds to the flow direction of the particles during the transition from the feed hopper into the distribution element, and a substantially horizontal tangent at the outlet opening, which corresponds substantially to the ejection direction of the particles. The radius of curvature of the guide surface increases continuously between the inlet and outlet openings. Preferably, the radius of curvature of the guide surface at the inlet opening substantially corresponds to the horizontal clear width of the inlet opening and at the outlet opening substantially corresponds to the vertical clear height of the outlet opening. This ensures that the passage cross-section available for the particle flow in the distribution element between the horizontal inlet opening and the vertical outlet opening is not reduced, i.e. there is no bottleneck that would otherwise reduce the throughput of particle material. Here, the term "passage cross-section" is to be understood to mean the clear surface in the distribution element that is arranged perpendicularly to the guide surface at a specific point on the guide surface of the deflection element. Preferably, the passage surface between the horizontal inlet opening and the vertical outlet opening increases continuously. Here, the horizontal inlet opening is an annular surface, which merges continuously into a vertical lateral surface along the guide surface.

In an embodiment of the filling device according to the invention, several distribution elements are arranged one below the other vertically offset, wherein the horizontal inlet openings and the vertical outlet openings are arranged radially offset from one another from top to bottom with respect to the rotation axis A, wherein the radial spacing of the inlet and outlet openings of the distribution elements from the rotation axis A decreases from top to bottom. Since the distribution elements rotate at the same rotational speed around the rotation axis A during operation, greater centrifugal forces act on particles in the uppermost distribution element than on particles in the lowermost distribution element. In order to at least partially compensate for this effect, it is preferably provided that the ratio between the clear height of the outlet opening and the clear width of the inlet opening is greater for distributing elements arranged further down than for distributing elements arranged further up. In the sense of the present invention, "top" and "bottom" mean relative orientations with respect to the gravity-driven feed of the particles from the feed hopper, i.e. elements arranged further "up" are located closer to the feed hopper than elements arranged further "down".

Preferably, the clear height of the outlet opening is at least 25% greater (1.25 times greater) than the clear width of the inlet opening. Particularly preferably, the clear height of the outlet opening is at least 50% greater (1.5 times greater) than the clear width of the inlet opening. For example, the clear height of the outlet opening can be 1.25 to 3 times greater, preferably 1.5 to 2 times greater, than the clear width of the inlet opening. This ensures that sufficient space is available for the deflection of the particle flow from the horizontal to the vertical flow direction and, in particular, that the outlet resistance at the outlet opening is reduced after acceleration of the particles by the centrifugal force. The larger outlet opening also increases the throughput (particle volume per unit of time) without excessively increasing the flow speed. Moreover, a ratio of the height of the outlet opening to the width of the inlet opening of at least 1.25 ensures that no backflow occurs in the particle flow.

According to an embodiment of the invention, the guide surface is designed as a "clothoidal" transition surface. A clothoidal transition surface is understood to be a transition surface whose radius of curvature increases continuously. In the sense of the present invention, a clothoidal transition surface is to be understood to mean both classical clothoids, in which the radius of curvature increases linearly, and power clothoids, in which the curvature does not increase linearly. Alternatively, the course of the radius of curvature of the transition surface can also be described using Bézier or spline segments, for example as a cubic Bézier spline whose end tangents are vertical or horizontal.

The clothoid is characterised in that its radius of curvature increases continuously along the curve, which leads to a particularly smooth transition between a vertical and horizontal flow direction. This avoids abrupt changes in direction and the associated mechanical loads on the catalyst material. Avoiding impact loads on the often porous or brittle catalyst material also leads to a significant reduction in abrasion, breakage and fine dust formation, which in turn improves the reactor performance and service life of the material. Since a clothoidal surface can be described with mathematical precision, the corresponding shapes can also be easily realised using CAD/CNC systems. In combination with the ratio of clear height to clear width of at least 1.25 provided according to the invention, a longer guide surface is provided, which in turn enables a smoother curvature progression and thus further protection of the catalyst material.

According to the second embodiment of the invention, the drive bearing is arranged within a peripheral bearing housing which can be subjected to a purge gas flow. This measure serves in particular to protect and ensure the operational safety of the bearing system and is associated with a number of technical advantages. In a filling device with free-flowing, fine-grained catalyst material, there is always a risk of particles or, in particular, dust (e.g. from particle abrasion) entering the bearing system. By supplying the bearing housing with purge gas, a continuous flow of air is generated from the bearing housing to the outside, which reliably prevents the penetration of solids or removes solids that have already penetrated, which in turn reduces wear on bearing components and extends the service life of the drive bearing. In the embodiment, the purge gas can additionally be temperature-controlled or dried, whereby condensation, temperature fluctuations and corrosion can be avoided. The formation of a peripheral, closed bearing housing moreover simplifies the outer sealing against the reactor chamber and protects sensitive components from chemical or thermal stress. In combination with the drive motor arranged outside the feed hopper, this results in a completely encapsulated, maintenance-friendly drive system that minimises particle contact in the direct drive region. The drive motor can, for example, be formed as a pneumatic motor, in particular as a pressurised air vane motor. In this case, the purge gas supply can also be used to operate the pneumatic motor. The purge gas can, for example, be compressed air or an inert gas such as nitrogen, for example. In particular when using catalytic converters that react easily with oxygen, inert gas is preferably used both for the purge gas and for operating the drive motor.

Advantageously, the bearing housing has a connection for the supply of purge gas. The defined connection enables a controlled and metered introduction of purge gas into the bearing housing, which ensures a stable overpressure atmosphere and thus optimises the protection of the drive bearing. Moreover, the connection enables integration into existing compressed air or inert gas networks or connection to a compressor arranged outside the reactor. The connection can be equipped with standardised control valves or sensors, which allows the purge gas system to be monitored and automated, for example to detect leaks or to adjust to changing operating conditions.

In a further design of the invention, the purge gas is at least partially discharged from the bearing housing into particle flow inside the filling device. The purge gas thus not only serves to protect the drive bearing, but also guides the dust particles back into the particle flow in a targeted manner. At the same time, the purge gas prevents further dust deposits inside the filling device. Moreover, the proposed flow guide specifically prevents a backflow of particles from the feed hopper or the distribution device into the bearing region.

According to the third embodiment of the invention, the lower end of the feed hopper has at least one annular insert which feeds the particle flow to the at least one distribution element. Preferably, the annular insert here consists of at least one concentric annular tube arranged radially symmetrically around the rotation axis, which respectively feeds a partial flow of the particle flow to an allocated distribution element. The annular insert here acts as a fluidic guide element that feeds the particle flow emerging from the feed hopper to the respective distribution element exactly at the desired position and in the defined cross-section. This optimises the geometric coupling between the feed hopper and the distribution element and ensures a more uniform flow to the inlet opening of the distribution element. The annular insert also contributes to eliminating asymmetrical or inclined flow components, such as those that can arise due to wall friction or uneven particle transport in the feed hopper. This generates a uniform axial and radially symmetrical flow, which is crucial for deflection and distribution in the distribution element. Since the annular insert advantageously comprises at least one concentric annular tube arranged radially symmetrically around the rotation axis, ideal flow conditions are also ensured for the clothoidal guide surface in the distribution element. The annular insert can be modularly adjusted to the respective size of the reactor or the desired particle throughput. Preferably, the annular insert comprises at least three annular tubes such that multi-channel and simultaneous particle distribution is possible on several levels of the distribution device. This increases the overall capacity of the filling device and allows the reactor to be filled more efficiently and evenly. In addition, the division of the total particle flow into several partial flows reduces the local mass flow density in each annular tube, which minimises the mechanical stress on the particles and reduces abrasion and breakage.

The annular tubes can be connected to one another via webs and arranged in steps along the central rotation axis (A), offset downwards. This results in contact surfaces for flow regulation means, such as in particular freely insertable annular diaphragms with a defined central passage opening, with which the particle flow can be specifically modulated in order to form a particle front that is as flat as possible in the container to be filled.

According to a development of the invention, which can be combined with all embodiments, the drive motor and the drive bearing are fixed to a radial carrier plate arranged between the feed hopper and the distribution device, wherein the carrier plate forms the top of the bearing housing. The common carrier plate brings the drive motor, bearing and distribution unit together to form a mechanically rigid, precisely aligned unit, which improves the smooth running of the distribution unit and reduces vibrations and misalignment forces. The dual function of the carrier plate as a mechanical bearing element and a component of the bearing housing reduces the need for additional structural elements, which makes the overall design of the filling device more compact, which in turn is particularly advantageous where installation space is limited.

According to a variant of the embodiments in which the bearing housing can be subjected to a purge gas flow, the fixed bearing ring of the drive bearing can be connected to the carrier plate, wherein passage openings for the purge gas are cut out between the carrier plate and the fixed bearing ring, which enable the purge gas to pass from the bearing housing into the interior of the filling device. Here, the passage openings can be recessed as a plurality of radially distributed channels in the surface of the carrier plate or in the surface of the fixed bearing ring or in the two components. For effective removal of the purge gas from the bearing housing into the interior of the filling device, a small number of passage openings distributed around the periphery of the contact region between the carrier plate and the fixed bearing ring are sufficient such that the structural integrity of the mechanical connection between the fixed bearing ring and the carrier plate is maintained.

According to a further embodiment, the purge gas is specifically discharged into the particle flow via a gap formed between the rotating bearing ring of the drive bearing and the annular insert. Here, the particle flow is formed between the outermost annular tube of the annular insert and the rotating bearing ring of the drive bearing. The gap prevents friction between the rigid annular tube of the annular insert and the rotating bearing ring of the drive bearing. Such a gap is difficult to clean due to its design, such that the purge gas guide provided according to the invention not only serves to discharge the dust-laden purge gas from the bearing housing into the interior of the filling device, but also simultaneously ventilates the gap and prevents the formation of material accumulations in this region, which improves the cleaning and maintenance of the filling device.

In all embodiments, the drive bearing can comprise a ball bearing. Ball bearings are characterised by low friction and smooth, easy running, which enables energy-efficient rotation of the distribution device. The ball bearing forms the connection between the inner rotating bearing ring and the outer fixed bearing ring, wherein sealing lips, such as e.g. rubber lips, can be provided in order to seal the ball bearing against unwanted dust ingress.

In embodiments in which a carrier plate is provided, the drive motor can be fixed on the carrier plate in such a way that it can be radially shifted in relation to the vertical rotation axis, which enables easy belt tensioning or detensioning without separate tensioning mechanisms. Moreover, the drive motor can be flexibly positioned depending on the chosen motor, pulley, or desired gear ratio, which ensures high adaptability to various performance requirements.

Preferably, the distribution device can moreover comprise a central lower distribution element with a central circular inlet opening and a central deflection element, which enables optimal use of the axial material flow from the feed hopper. In combination with the surrounding annular distribution elements, the central element can cover an additional distribution zone in the reactor centre, which further improves the homogeneity of the bulk. The central deflection element also largely deflects the vertical particle flow into a horizontal, radially outward-directed particle flow. In addition, a vertically downwardly open outlet opening can be provided in a base plate of the central distribution element, which discharges a partial flow of the particle flow perpendicularly downward into the reactor chamber, such that sufficient material is also separated in the central reactor region for even loading.

Preferably, the feed hopper and the distribution device are dimensioned in such a way that the sum of the inlet surfaces of the distribution elements of the distribution device substantially corresponds to the outlet opening of the feed hopper, such that a continuous material flow is ensured, except for any flow control means that may be present. This ensures that the dimensioning of the feed hopper and the distribution device does not impede the material flow between the feed hopper and the distribution device. Moreover, the even surface distribution supports an even distribution of the particle flow among all distribution elements, which homogenises the reactor loading and prevents local material accumulations in the reactor. Influencing the material flow or the formation of a backlog of material before the distribution device should instead be achieved via controllable or monitorable flow control means, as described, for example, in the international patent application WO 2017/167957 A, or by means of freely insertable annular diaphragms described for the first time herein.

Preferably, the at least one distribution element has, in its radially symmetrical, rigid central section, a plurality of vertical, spaced-apart, and radially outwardly extending rigid vertical webs distributed over its periphery, which divide the distribution element into a plurality of radially symmetrical sectors. Such rigid webs act as flow guide ribs that evenly direct the horizontally emerging particle flow in several defined directions, which in turn promotes homogeneous surface distribution in the reactor, since any disturbances in the material flow cannot spread beyond the periphery of the distribution elements. Therefore, the defined sectors prevent the particle flow from preferentially spreading in individual regions and thus promote an even bulk density. The rigid webs additionally increase the mechanical strength of the distribution element and have a stabilising effect against torsional and bending loads during rotation, such that the material thickness can be reduced compared to web-free distribution devices. The number of sectors can vary depending on the task and the shape and size of the particulate catalyst material. For example, in a distribution device with three distribution elements, 20 to 30 sectors can be provided for the uppermost distribution element, 10 to 20 sectors for the middle distribution element, and 4 to 10 sectors for the bottom distribution element.

According to a variant possible in all embodiments, the at least one distribution element has, on its lower edge, a peripheral, one-piece, horizontal elastic extension extending radially outwards from the outlet opening. Here, the elastic extensions serve as soft, yielding guide surfaces that guide the particles further without harsh collision after leaving the outlet opening. Here, the horizontal extension preferably has a radius that continuously increases over the circumference or over at least one circular segment, such that individual sectors are provided with a shorter extension and other sectors with a longer extension. This enables optimisation of the homogeneous loading of the reactor even with large reactor cross-sections, while at the same time the number of distribution elements, i.e., the ejection planes, does not need to be increased.

Moreover, elastic vertical extensions can be provided, which extend radially outwards at the end of each of the vertical rigid webs, which in turn enables a soft, compliant guidance of the particles leaving the outlet opening across the reactor cross-section. Here, the radial length of the vertical extensions typically corresponds to the radius of the corresponding horizontal extension, such that the vertical extensions also have a radius that continuously increases over a circumference or a circular segment.

The elastic horizontal and vertical extensions can be made of rubber, for example, or other rubber-elastic plastic and can be detachably or permanently connected to each other.

The elastic extensions of the individual planes are preferably also formed as clothoids, in which the radius of the horizontal and/or vertical extensions on each plane continuously decreases from a starting radius to an end radius. From one plane to the plane below, it is also preferably provided that the end radius of the upper plane corresponds to the starting radius of the lower plane, such that the radii of the extensions are continuously continued when transitioning from one plane to the other.

SHORT DESCRIPTION OF THE DRAWINGS

The invention is explained in more detail below by means of an exemplary embodiment depicted in the attached drawings.

Figure 2:
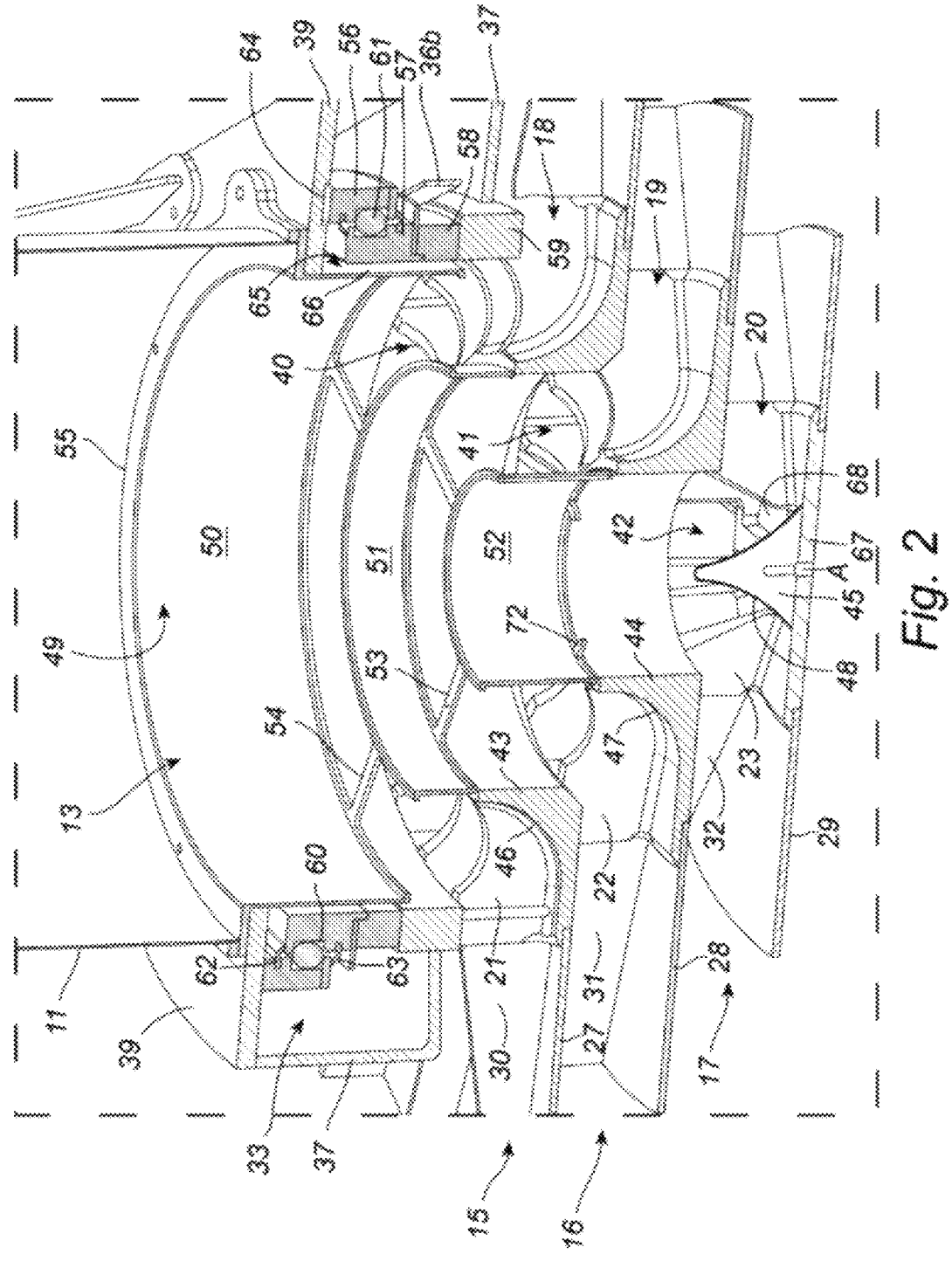
Figures 3, 4:
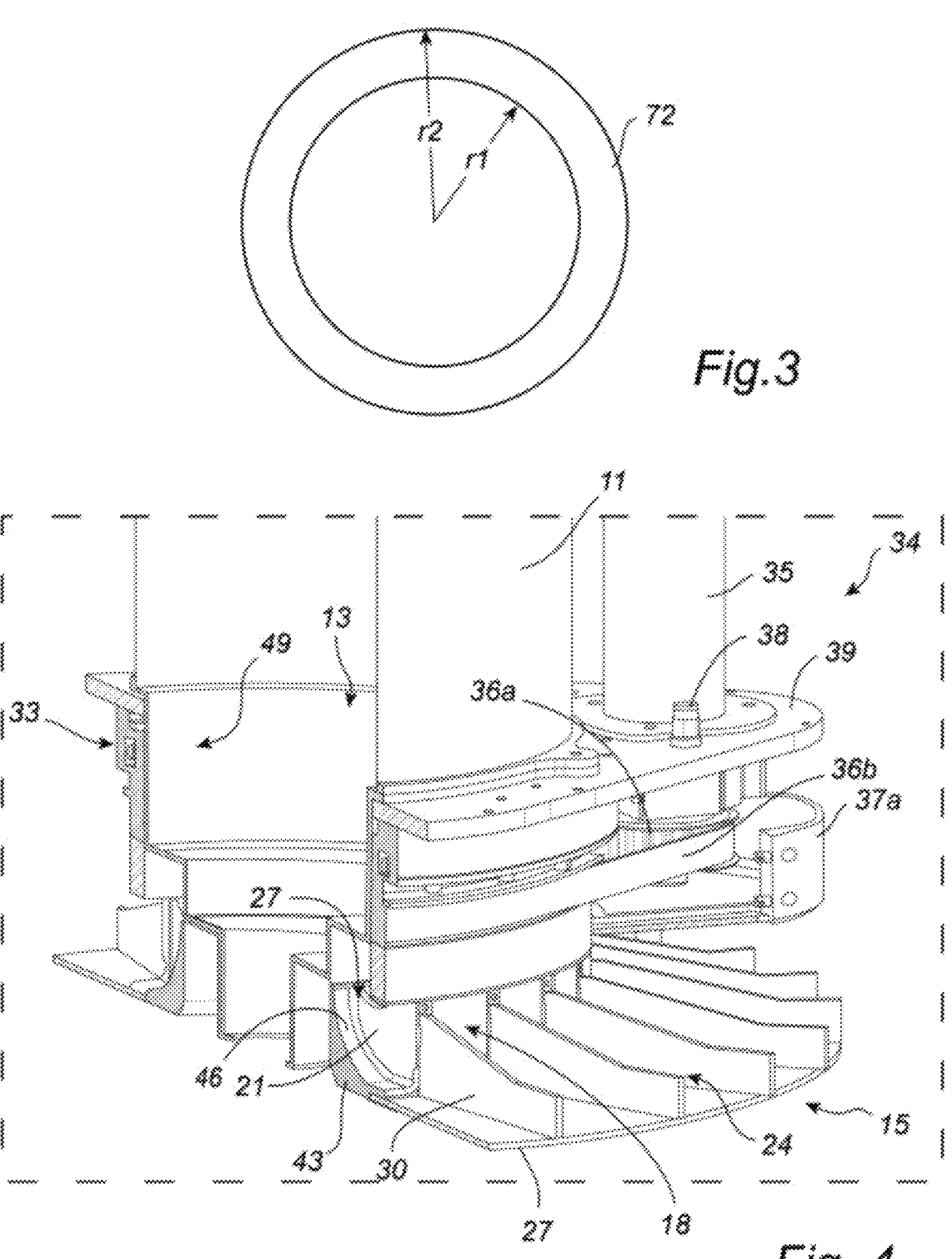
Figure 5:
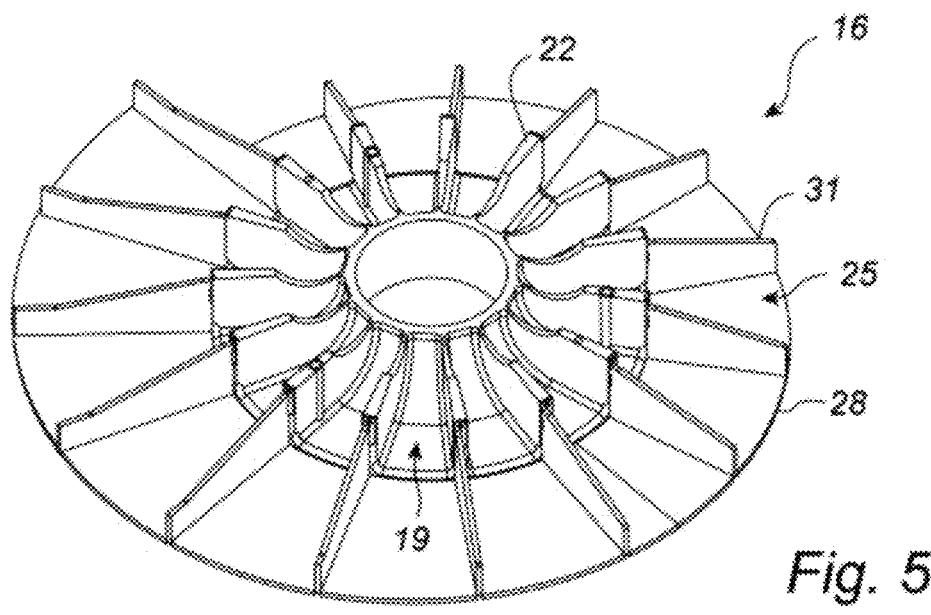
Figure 6:
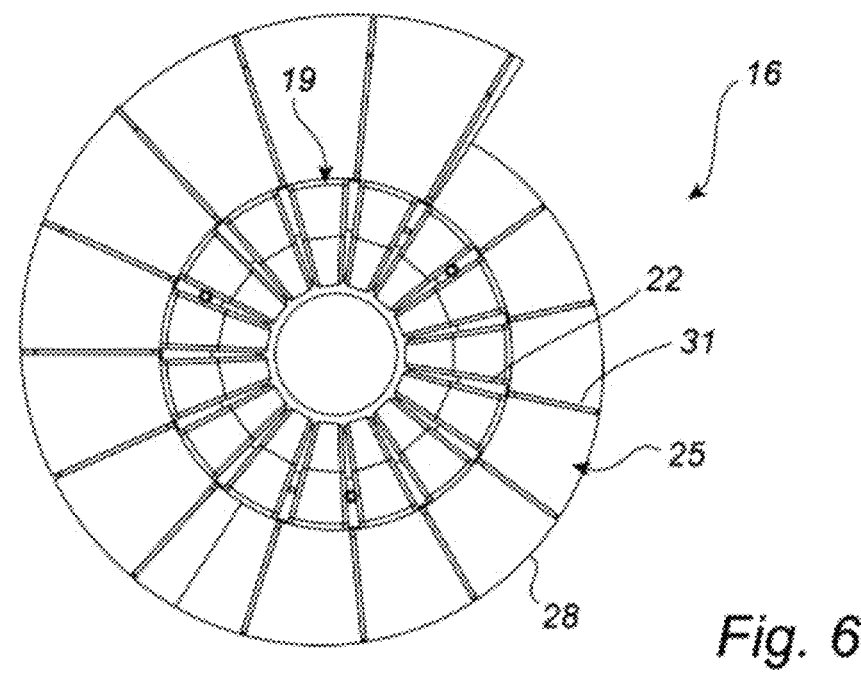
Figures 7, 8:
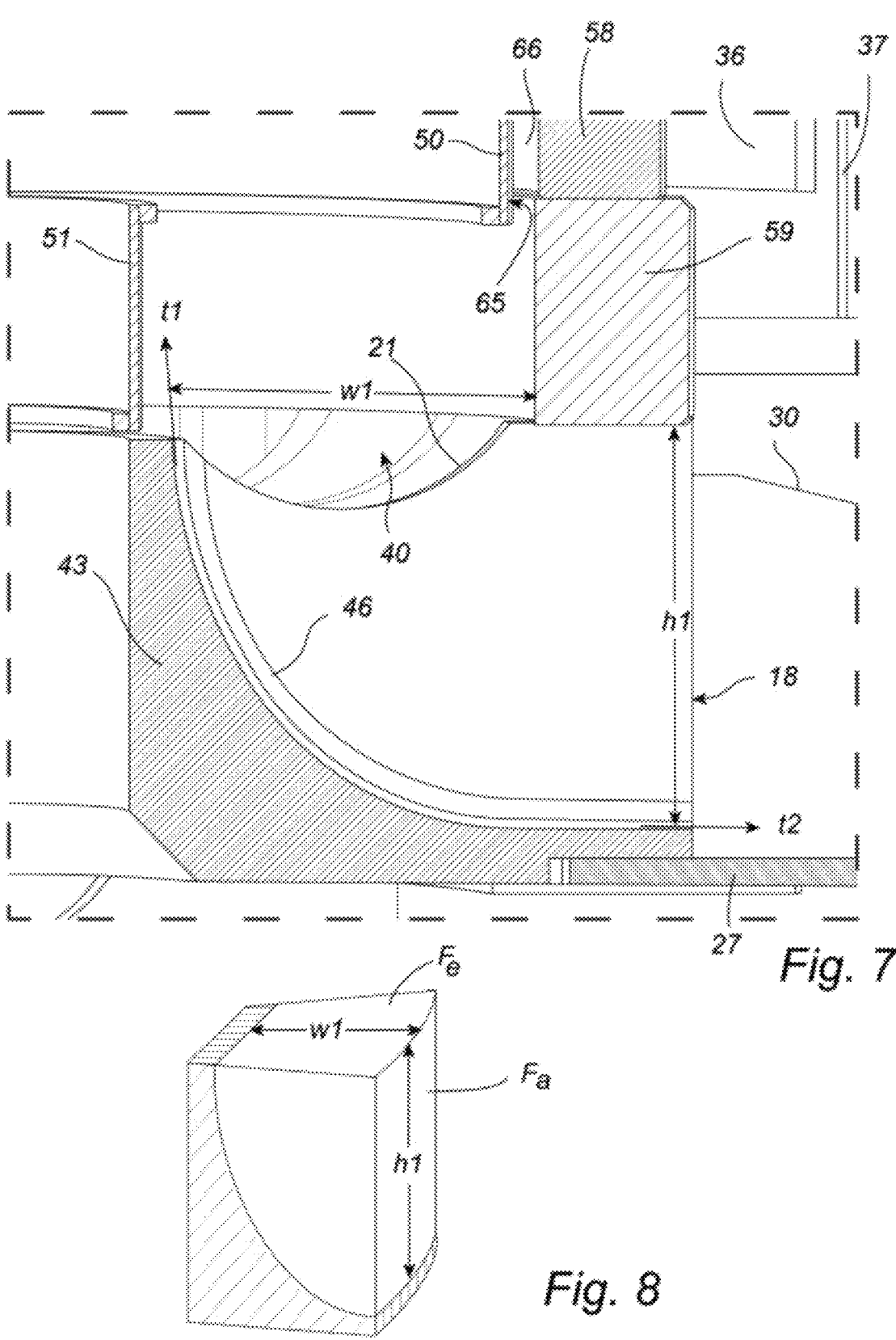
Figure 9:
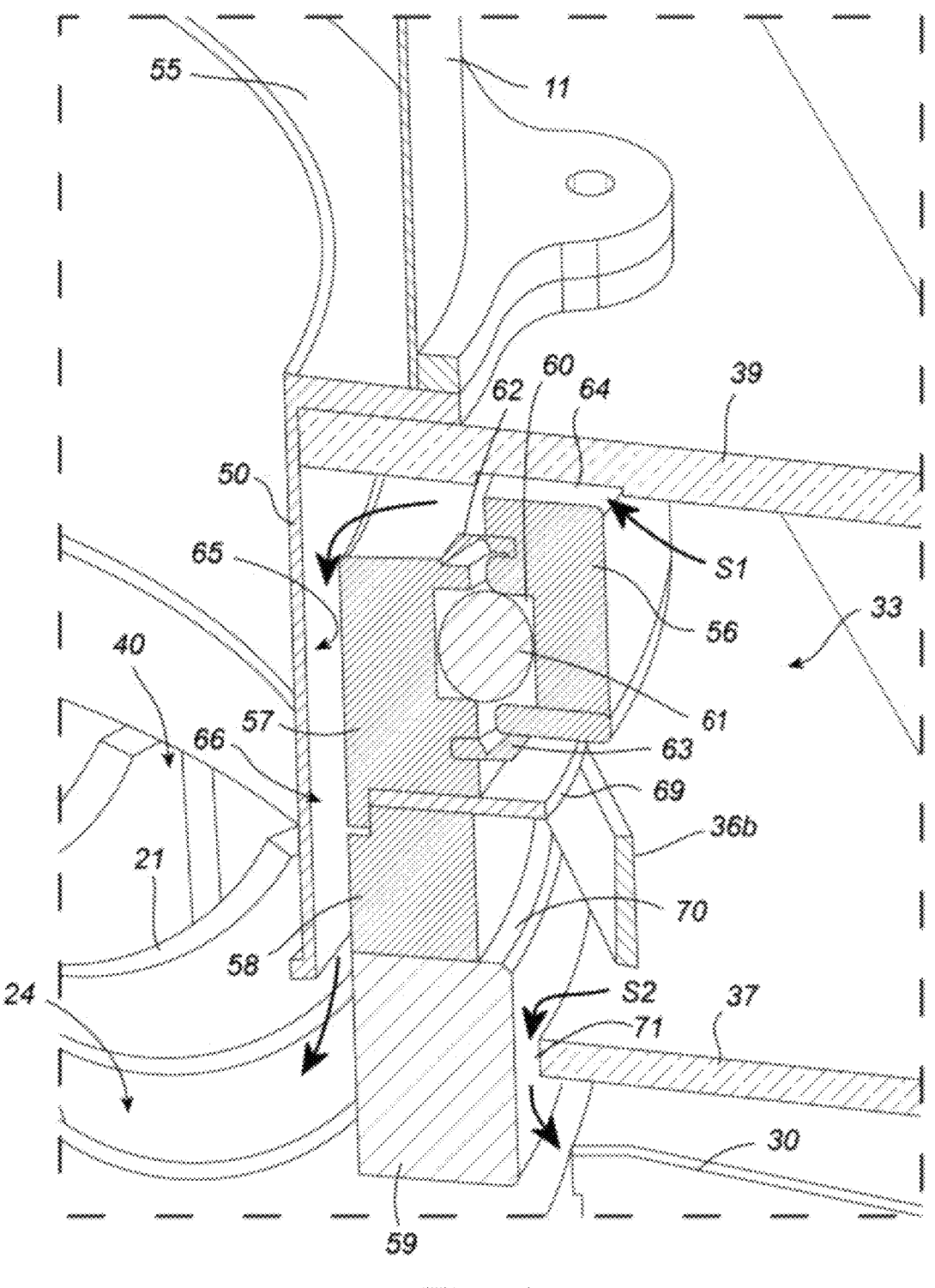

In the drawings are shown in:

FIG. 1 a perspective view of an embodiment of the filling device according to the invention;

FIG. 2 a perspective drawing in partial cross-section of the filling device of FIG. 1;

FIG. 3 a schematic depiction of an annular diaphragm for flow control;

FIG. 4 a perspective drawing in partial cross-section of the filling device of FIG. 1 in a different viewing angle than FIG. 2;

FIG. 5 a perspective detailed view of the central distribution element of the filling device of FIG. 1;

FIG. 6 a top view of the central distribution element of FIG. 5;

FIG. 7 an enlarged cross-sectional depiction of a deflection element of the distribution device of the filling device depicted in FIG. 2;

FIG. 8 a schematic depiction of the surface ratios in the deflection elements of the filling device of FIG. 1; and FIG. 9 an enlarged detailed depiction of the drive bearing of the filling device depicted in FIG. 2.

PARTICULAR ASPECTS AND EMBODIMENTS

A first aspect of the invention relates to a first type of a filling device.

According to a first embodiment, said filling device (10) for dense loading of a chemical reactor with particulate catalyst material comprises a feed container (11) for particulate catalyst material having an upper inlet opening (12) and a lower outlet opening (13);

a distribution device (14) that is arranged below the feed hopper (11) for distributing the particulate catalyst material in the chemical reactor by centrifugal force, rotatably around a vertical rotation axis (A), wherein the distribution device (14) comprises at least one first, annular distribution element (15, 16) that has an upper, annular, substantially horizontal inlet opening (40, 41) with a clear width (w1, w2), a substantially vertical outlet opening (18, 19) directed radially outwards with respect to the rotation axis (A) and a clear height (h1, h2), and a deflection element (43, 44) arranged between the inlet opening and the outlet opening, wherein the deflection element deflects a substantially vertical particle flow coming from the feed hopper (11) into a substantially horizontal particle flow;

a drive bearing (33) arranged radially symmetrically to the rotation axis (A), which has a fixed bearing ring (56) directly or indirectly connected to the feed hopper (11) and a rotating bearing ring (57) connected to the distribution device (14); and a drive device (34) that has a drive motor (35) arranged laterally offset from the vertical rotation axis (A) outside the feed hopper (11) and a belt drive (36), wherein the drive motor (35) drives the rotating bearing ring (57) of the drive bearing (33) via the belt drive (36); characterised in that the clear height (h1, h2) of the outlet opening (18, 19) is greater than the clear width (w1, w2) of the inlet opening (40, 41), and the deflection element (43, 44) has a guide surface (46, 47) which has a substantially vertical tangent (t1) at the inlet opening (40, 41) and a substantially horizontal tangent (t2) at the outlet opening (18, 19), where the radius of curvature of the guide surface (46, 47)

increases continuously from the inlet opening (40, 41) to the outlet opening (18, 19).

According to a second embodiment, said filling device according to embodiment one is characterised in that the drive bearing (33) is arranged within a peripheral bearing housing (37) which can be acted upon by a purge gas flow.

According to a third embodiment, said filling device according to embodiment one is characterised in that the lower end of the feed hopper (11) has at least one annular insert (49) which directs the particle flow to the at least one distribution element (15, 16).

A second aspect of the invention relates to a second type of a filling device.

According to a fourth embodiment, said filling device (10) for dense loading of a chemical reactor with particulate catalyst material comprises
  a feed hopper (11) for particulate catalyst material with an upper inlet opening (12) and a lower outlet opening (13);
  a distribution device (14) that is arranged below the feed hopper (11) for distributing the particulate catalyst material in the chemical reactor by centrifugal force, rotatably around a vertical rotation axis (A), wherein the distribution device (14) comprises at least one first, annular distribution element (15, 16) that has an upper, annular, substantially horizontal inlet opening (40, 41) with a clear width (w1, w2), a substantially vertical outlet opening (18, 19) directed radially outwards with respect to the rotation axis (A) and has a clear height (h1, h2), and a deflection element (43, 44) arranged between the inlet opening and the outlet opening, wherein the deflection element deflects a substantially vertical particle flow coming from the feed hopper (11) into a substantially horizontal particle flow;
  a drive bearing (33) arranged radially symmetrically relative to the rotation axis (A), which has a fixed bearing ring (56) directly or indirectly connected to the feed hopper (11) and a rotating bearing ring (57) connected to the distribution device (14); and
  a drive device (34) that has a drive motor (35) arranged laterally offset from the vertical rotation axis (A) outside the feed hopper (11) and a belt drive (36), wherein the drive motor (35) drives the rotating bearing ring (57) of the drive bearing (33) via the belt drive (36);
  characterised in that
  the drive bearing (33) is arranged inside a peripheral bearing housing (37) which can be supplied with a purge gas flow.

According to a fifth embodiment, said filling device according to embodiment four is characterised in that
  the clear height (h1, h2) of the outlet opening (18, 19) is greater than the clear width (w1, w2) of the inlet opening (40, 41),
  and the deflection element (43, 44) has a guide surface (46, 47) which has a substantially vertical tangent (t1) at the inlet opening (40, 41) and a substantially horizontal tangent (t2) at the outlet opening (18, 19), where the radius of curvature of the guide surface (46, 47) increases continuously from the inlet opening (40, 41) to the outlet opening (18, 19).

According to a sixth embodiment, said filling device according to embodiment four is characterised in that the lower end of the feed hopper (11) has at least one annular insert (49), which feeds the particle flow to the at least one distribution element (15, 16).

A third aspect of the invention relates to a third type of a filling device.

According to a seventh embodiment, said filling device (10) for dense loading of a chemical reactor with particulate catalyst material comprises
  a feed hopper (11) for particulate catalyst material having an upper inlet opening (12) and a lower outlet opening (13);
  a distribution device (14) that is arranged below the feed hopper (11) for distributing the particulate catalyst material in the chemical reactor by centrifugal force, rotatably around a vertical rotation axis (A), wherein the distribution device (14) comprises at least one first, annular distribution element (15, 16) that has an upper, annular, substantially horizontal inlet opening (40, 41) with a clear width (w1, w2), a substantially vertical outlet opening (18, 19) directed radially outwards with respect to the rotation axis (A) and having a clear height (h1, h2), and a deflection element (43, 44) arranged between the inlet opening and the outlet opening, wherein the deflection element deflects a substantially vertical particle flow coming from the feed hopper (11) into a substantially horizontal particle flow;
  a drive bearing (33) arranged radially symmetrically to the rotation axis (A), which has a fixed bearing ring (56) connected directly or indirectly to the feed hopper (11) and a rotating bearing ring (57) connected to the distribution device (14); and
  a drive device (34) that has a drive motor (35) arranged laterally offset from the vertical rotation axis (A) outside the feed hopper (11) and a belt drive (36), wherein the drive motor (35) drives the rotating bearing ring (57) of the drive bearing (33) via the belt drive (36);
  characterised in that
  the lower end of the feed hopper (11) has at least one annular insert (49), which feeds the particle flow to the at least one distribution element (15, 16).

According to an eighth embodiment, said filling device according to embodiment seven is characterised in that
  the clear height (h1, h2) of the outlet opening (18, 19) is greater than the clear width (w1, w2) of the inlet opening (40, 41),
  and the deflection element (43, 44) has a guide surface (46, 47) which has a substantially vertical tangent (t1) at the inlet opening (40, 41) and a substantially horizontal tangent (t2) at the outlet opening (18, 19), where the radius of curvature of the guide surface (46, 47) increases continuously from the inlet opening (40, 41) to the outlet opening (18, 19).

According to a ninth embodiment, said filling device according to embodiment seven is characterised in that the drive bearing (33) is arranged inside a peripheral bearing housing (37), said drive bearing being able to be supplied with a purge gas flow.

According to a tenth embodiment, said filling device according to one of embodiments one, five or eight is characterised in that the clear height (h1, h2) of the outlet opening (18, 19) is at least 1.25 times greater than the clear width (w1, h2) of the inlet opening (40, 41).

According to an eleventh embodiment, said filling device according to one of embodiments one, five or eight is characterised in that the guide surface (46, 47) is designed as a clothoidal transition surface.

According to a twelfth embodiment, said filling device according to one of embodiments three, six or seven is characterised in that the annular insert (49) consists of at least one concentric, annular tube (50, 51) arranged radially symmetrically around the rotation axis (A), which in each case supplies a partial flow of the particle flow to an allocated distribution element (15, 16).

According to a thirteenth embodiment, said filling device according to one of embodiments two, four or nine is characterised in that purge gas is at least partially discharged from the bearing housing (37) into the particle flow inside the filling device.

According to a fourteenth embodiment, said filling device according to one of embodiments two, four or nine is characterised in that the drive motor (35) and the drive bearing (33) are fastened to a radial carrier plate (39) arranged between the feed hopper (11) and the distribution device (14), wherein the carrier plate (39) forms the upper side of the bearing housing (37).

According to a fifteenth embodiment, said filling device according to embodiment fourteen is characterised in that the fixed bearing ring (56) of the drive bearing (33) is connected to the carrier plate (39), wherein passage openings (64) for the purge gas are provided between the carrier plate and the fixed bearing ring.

According to a sixteenth embodiment, said filling device according to embodiment fifteen is characterised in that the purge gas is discharged into the particle flow via an intermediary chamber (66) formed between the rotating bearing ring (57) of the drive bearing and the annular insert (49).

According to a seventeenth embodiment, said filling device according to embodiment sixteen is characterised in that the drive bearing (33) comprises a ball bearing (61).

According to an eighteenth embodiment, said filling device according to one of embodiments one, four or seven is characterized in that the drive motor (35) is fixed on the carrier plate (39) so as to be radially displaceable relative to the vertical rotation axis (A).

According to a nineteenth embodiment, said filling device according to one of embodiments one, four or seven is characterised in that the distribution device (14) also has a central distribution element (17) with a central circular inlet opening (42) and a central deflection element (45).

According to a twentieth embodiment, said filling device according to one of embodiments one, four or seven is characterised in that the at least one distribution element (15, 16, 17) has a plurality of vertical, spaced-apart and radially outwardly extending rigid webs (21, 22, 23) distributed over its periphery, which divide the distribution element into a plurality of radially symmetrical sectors (24, 25, 26).

According to a twenty-first embodiment, said filling device according to one of embodiments one, four or seven is characterised in that the at least one distribution element (15, 16, 17) has on its lower edge a peripheral, one-piece, horizontal elastic extension (27, 28, 29) extending radially outwards from the outlet opening (18, 19, 20).

According to a twenty-second embodiment, said filling device according to embodiment twenty-one is characterised in that the horizontal extension (27, 28, 29) has a radius which increases continuously over its circumference or over at least one circular segment. According to a twenty-third embodiment, said filling device according to embodiment twenty-one is characterised in that elastic vertical extensions (30, 31, 32) are also provided, which extend radially outwards at the end of each of the vertical rigid webs (21, 22, 23).

A fourth aspect of the invention relates to a distribution device according to one of embodiments one, nineteen and twenty-three.

A fifth aspect of the invention relates to method for dense loading of a chemical reactor with particulate catalyst material, comprising the use of a filling device (10) according to one of embodiments one to twenty-three.

DETAILED DESCRIPTION OF THE DRAWINGS

In FIG. 1, an embodiment of the filling device according to the invention for the dense loading of a (not shown) chemical reactor with particulate catalyst material is depicted in a perspective side view. The filling device 10 comprises a cylindrical feed hopper 11 for particulate catalyst material (not depicted in the drawings). The feed hopper 11 has an upper inlet opening 12 and a lower outlet opening 13 (not depicted) for the particulate catalyst material.

A three-stage distribution device 14 is arranged below the feed hopper 11, said distribution device being arranged to be able to rotate around a vertical central rotation axis A for distributing the particulate catalyst material in the chemical reactor by centrifugal force. In the depicted embodiment, the distribution device 14 has three distribution elements 15, 16, 17 arranged vertically one below the other, which deflect a substantially vertical particle flow coming from the feed hopper 11 into a substantially horizontal, radially outwardly directed particle flow. Due to the rotation of the distribution device, the particulate catalyst material is additionally accelerated radially outwards by centrifugal force, such that the catalyst material can be distributed across the cross-section of the chemical reactor to be filled. The concentrically distribution elements 15, 16, 17 arranged concentrically vertically one below the other have different radii, such that the particles emerging from the individual distribution elements experience a different centrifugal force and are thus discharged to different distances in the radial direction into the reactor interior. The first upper distribution element 15, which is particularly clearly visible in the depiction in FIG. 1, has outlet openings 18 that are radially furthest away from the rotation axis A, such that the corresponding particles deflected via the first distribution element are ejected into the reactor interior at the greatest radial velocity. As can be seen particularly clearly in FIG. 2, the outlet openings 19 of the second, middle distribution element 16 are, by contrast, offset radially inwards in the direction of the rotation axis A, while the outlet openings 20 of the third, lower distribution element 17 are offset radially even further inwards in the direction of the rotation axis A. As can be seen in FIG. 1 for the first, upper distribution element 15 and also in FIG. 1 for the distribution elements 16 and 17, the distribution elements 15, 16, 17 have numerous vertical, spaced-apart, and radially outwardly extending rigid webs 21, 22, 23 distributed over their periphery, which divide the distribution elements into a plurality of radially symmetrical sectors 24, 25, 26. The distribution elements 15, 16, 17 additionally have a peripheral, one-piece, horizontal elastic extension 27, 28, 29 extending radially outwardly from the respective outlet openings, which have a radius that continuously increases over its circumference or over a circular segment. This allows the ejection distance of the particulate catalyst material to be additionally influenced on the plane of each distribution element 15, 16, 17, and a more homogeneous distribution of the catalyst material across the cross-section of the reactor to be achieved. As can be seen in FIG. 1, particularly in the first upper distribution element 15, elastic vertical extensions 30, 31, 32 are also provided, which extend radially outwards at the end of each vertical rigid web 21, 22, 23 of the distribution elements 15, 16, 17 and substantially have the same radius, which continuously increases over the circumference or a segment of a circle.

Therefore, the sectoral division of the distribution elements 15, 16, 17 is also continued at the level of the elastic extensions 27, 28, 29.

A drive bearing 33 is arranged between the feed hopper 11 and the distribution device 14, which rotatably connects the rigid feed hopper 11 to the rotatable distribution device 14. The drive bearing 33 is depicted in more detail in FIG. 2.

Moreover, the filling device 10 comprises a drive device 34, which has a drive motor 35 arranged laterally offset in relation the vertical rotation axis A outside the feed hopper 11, and a belt drive 36, which can rotate the distribution device 14 via the drive bearing 33. As can be seen in particular in FIG. 4, the belt drive 36 comprises a drive wheel 36a connected to the drive motor 35 and a drive belt 36b, which transmits the rotational movement of the drive wheel 36a to the drive bearing. 33 The drive bearing 33 and the belt drive 36 are surrounded by a bearing housing 37, which can be supplied with compressed air or inert gas via a purge gas connection 38. The feed hopper 11 and the drive motor 35 are mounted on a carrier plate 39, which forms the top of the bearing housing 37. A compressed air vane motor is used as the drive motor 35.

FIG. 2 shows a perspective partial view of the filling device 10 of FIG. 1 in partial cross-section. Elements that have already been explained in connection with the depiction in FIG. 1 are designated by the same reference numbers. In FIG. 2, in particular, the vertically and radially staggered structure of the distribution device 14 can be seen, which comprises the first or upper distribution element 15, the second or middle distribution element 16 and the third or lower distribution element 17. The upper distribution element 15 is formed as an annular, rigid distribution element that has an upper, annular, substantially horizontal inlet opening 40 and the cylindrical vertical outlet opening 18 already depicted in FIG. 1, which is divided into individual sectors 24 by the vertical rigid webs 21. Accordingly, the middle, annular, rigid distribution element 16 has an upper, substantially horizontal inlet opening 41 and the rectangular, vertical outlet opening 19 already mentioned in connection with FIG. 1, but not immediately visible there, which is divided into individual sectors 25 by vertical webs 22. Finally, the lower, annular, rigid distribution element 17 has an upper, substantially horizontal inlet opening 42 and the vertical, rectangular outlet opening 20, also already mentioned in connection with FIG. 1 and also not immediately visible there, which is divided into individual sectors 26 by vertical webs 23. Each of the distribution elements 15, 16, 17 has a deflection element 43, 44, 45, which deflects the substantially vertical particle flow coming from the feed hopper 11 into a substantially horizontal particle flow. The rigid distribution elements 15, 16, 17 can be manufactured, for example, by injection moulding, 3D printing or milled from a plastic block.

According to the invention, it is provided that the clear heights h1, h2, h3 of the vertical outlet openings 18, 19, 20 of the distribution elements are greater than the clear widths w1, w2, w3 of the allocated horizontal inlet openings 40, 41, 42 of the distribution elements, i.e. the ratios h1/w1 or h2/w2 or h3/w3 are always greater than 1. For the sake of clarity, the clear height h1 and the clear width w1 are only depicted in the detailed view of FIG. 7 for the outlet opening 18 and the inlet opening 40 of the first or uppermost annular distribution element 15. For the second or middle annular distribution element 16, a corresponding geometry with clear height h2 and clear width w2 emerges. In the example depicted, however, the third or lower distribution element 17 does not have an annular inlet opening, but rather a circular inlet opening 42 centred around the rotation axis A. In this case, the "width" w3 is considered to be half the inner diameter of the circular inlet opening 42, i.e., the distance between the rotation axis A and the inner wall of the lower deflection element 45 at the level of the horizontal inlet opening 42.

The deflection elements 43, 44, 45 each have guide surfaces for the particulate material 46, 47, 48, which have a substantially vertical tangent at the inlet opening and a substantially horizontal tangent at the outlet opening, wherein the radius of curvature of the guide surfaces continuously increases from the respective inlet openings to the outlet openings. The guide surfaces 46, 47, 48 can, for example, be formed as clothoidal transition surfaces.

As can also be seen from FIG. 2, the lower end of the feed hopper 11 has an annular insert 49 which consists of three annular tubes arranged concentrically and radially symmetrically around the rotation axis A, which each feed a partial flow of the particle flow flowing vertically out of the feed hopper 11 to a corresponding distribution element 15, 16, 17. The lower annular tube 52, which is arranged above the inlet opening 42 of the lower distribution element 17, is connected via webs 53 to the middle annular tube 51, which is arranged above the inlet opening 41 of the middle distribution element 16. The middle annular tube 51 is in turn connected via webs 54 to the upper annular tube 50, which is arranged above the inlet opening 40 of the upper distribution element 15. The upper annular tube 50 has a peripheral edge strip 55, with which the entire annular insert 49 is screwed to the carrier plate 39. The lower annular tube 52 has inwardly projecting lugs 72 on its inner wall.

Moreover, in the depiction of FIG. 2, the drive bearing 33 is more clearly visible than in FIG. 1. The drive bearing 33 has a fixed bearing ring 56, which is connected to the underside of the carrier plate 39, and a rotating bearing ring 57, which can be rotated relative to the fixed bearing ring and is connected to the distribution device 14 via annular elements 58, 59, which form a guide for the belt drive 36. The fixed bearing ring 56 and the rotating bearing ring 57 define a ball bearing chamber 60, in which a ball bearing 61 is arranged in order to reduce friction during a relative movement between the fixed bearing ring 56 and the rotating bearing ring. The ball bearing chamber 60 is sealed at the top and bottom by elastic sealing lips 62, 63, wherein the upper sealing lip 62 is connected to the fixed bearing ring and rests against the top of the rotating bearing ring, while the lower sealing lip 63 is connected to the rotating bearing ring and rests against the underside of the fixed bearing ring. The drive bearing 33 with its individual components are more clearly visible in the enlarged view of FIG. 9.

Moreover, FIG. 2 shows that the third, lower distribution element 17 has a base plate 67 in which a bottom opening 68 is recessed, such that in the lowest distribution element 17, particulate material can not only emerge laterally from the outlet openings 20 under the effect of centrifugal force, but can also fall downwards through the bottom opening 68 into the centre of the container to be loaded under the effect of gravity. This measure prevents a funnel from forming in the centre of the container during the filling process.

Moreover, as can be seen in FIG. 2, the lower deflection element 45 of the lower distribution element 17 is formed as a central cone with a conical lower guide surface 48.

FIG. 3 shows a schematic depiction of an annular diaphragm for flow control. For each of the horizontal inlet openings 40, 41, 42, there is a set of annular diaphragms that allow the flow through the inlet openings 40, 41, 42 to be controlled in predetermined steps. The annular diaphragm 72 shown by way of example in FIG. 3 has an inner radius r1 and an outer radius r2. The annular diaphragms 72 are dimensioned in such a way that they can be placed on the shoulders of the annular insert 49. The annular diaphragms 72 intended for flow control of the horizontal inlet opening 40 have an outer diameter r2 that corresponds to the inner diameter of the upper annular tube. The annular diaphragms can thus be placed on the shoulder of the annular insert 49 defined by the webs 54. The inner diameter r1 of the annular diaphragms 72 intended for flow control of the horizontal inlet opening 40 then varies in predetermined steps between the outer diameter of the middle annular tube 51 (which corresponds to a complete closure of the inlet opening 40) and a value slightly smaller than the outer radius r2 (which corresponds to a nearly open inlet opening 40). Correspondingly, the annular diaphragms 72 intended for flow control of the horizontal inlet opening 41 have an outer diameter r2 that corresponds to the inner diameter of the middle annular tube and an inner diameter r2 that corresponds to the outer diameter of the lower annular tube 52, such that this set of annular diaphragms can be placed on the webs 53. The annular diaphragms 72 intended for flow control of the horizontal inlet opening 42 have an outer diameter r2 which corresponds to the inner diameter of the lower annular tube, such that the annular diaphragms can be placed on the lugs 72 of the lower annular tube 52. In this case, the inner diameter can even be zero, which corresponds to a complete closure of the inlet opening 42. Typically, 10 annular diaphragms can be provided per inlet opening 40, 41, 42, which are dimensioned in such a way that the flow can be varied between 0 and 90%. If no annular diaphragm 72 is inserted, the inlet opening is completely open (100%).

FIG. 4 shows a perspective depiction of the filling device 10 of FIG. 1 in partial cross-section from a different viewing direction, wherein in particular the drive device 34 with the drive motor 35 and the belt drive 36 is clearly visible. For the sake of simplicity, only the upper distribution element 15 of the three distribution elements of the distribution device 14 has been depicted here. Furthermore, in the depiction in FIG. 3, the bearing housing 37 is only indicated by a partial element 37a so that the belt drive 36 can be seen more clearly. Furthermore, the drive bearing 33 is only indicated schematically. For the structure of the drive bearing 33, particular reference is made to the detailed view in FIG. 9. Otherwise, elements that have already been explained in connection with FIGS. 1 and 2 are again referred to with the same reference numbers. It can be seen in particular that the belt drive 36 comprises a drive wheel 36a driven by the drive motor 35 and a drive belt 36b which transmits the rotating movement of the drive wheel 36a to the drive bearing 33.

FIG. 5 shows a perspective detailed view of the central distribution element 16 of the filling device of FIG. 1, and FIG. 6 shows a top view of the middle distribution element 16 of FIG. 5. It can be seen, by way of example, how the outer radius of the distribution element 16, defined by the outer periphery of the horizontal elastic extensions 28, increases from its rigid, radially symmetrical central section over the periphery in the manner of a clothoid, such that different ejection distances for the particulate material are achieved for different sectors 25. The same applies to the distribution elements 15 and 17.

FIG. 7 shows an enlarged depiction of the upper distribution element 15 of the distribution device 14. It can be seen in particular that the clear height h1 of the outlet opening 18 is significantly greater, in particular c. 25-50% greater, than the clear width w1 of the inlet opening 40 of the upper distribution element. This illustration also more clearly shows that the upper guide surface 46 of the upper distribution element 15 has a substantially vertical tangent t1 at the inlet opening 40 and a substantially horizontal tangent t2 at the outlet opening 18. The greater height of the outlet opening is ensured by the fact that the radius of curvature of the guide surface 46 increases continuously from the inlet opening 40 to the outlet opening 18, wherein continuous, in the mathematical sense, is understood as "monotonous" as opposed to "strictly monotonous", i.e. the radius of curvature should increase; however, sections in which the radius of curvature remains constant are also possible, particularly in the inlet and outlet region, where the horizontal and vertical tangent have already been reached. A corresponding guide surface can, for example, be formed as a clothoidal transition surface.

FIG. 8 shows a schematic depiction of the surface ratios in the deflection elements of the filling device of FIG. 1. It can be seen that a substantially trapezoidal inlet surface $F_e$ with a clear width w1 merges into a larger outlet surface $F_a$ with a clear height h1.

In FIG. 9, the design of the drive bearing 33 already described in connection with FIG. 2 is depicted in more detail. For example, one can see an advantageous guide of the drive belt 36b through the drive bearing 33. A guide ring 69 is inserted between the rotating bearing ring 57 and the annular element 58, said guide ring projecting radially outwards and forming an upper guide for the drive belt 36b. Moreover, the radial thickness of the annular element 59 is greater than the radial thickness of the annular element 58, such that a shoulder 70 emerges, which forms a lower guide for the drive belt 36b. Moreover, in FIG. 9 the guide of the purge gas from the bearing housing 37 into the interior of the distribution device 14 is depicted in more detail. When the interior of the bearing housing 37 is supplied with a purge gas flow, the purge gas can escape from the bearing housing 37 substantially in two ways, which are indicated in FIG. 9 by thick arrows S1 and S2. On the one hand, narrow passage openings 64 are cut out in the underside of the carrier plate 39, distributed over the periphery of the carrier plate 39 between the carrier plate 39 and the fixed bearing ring 56 connected to the carrier plate, which allow the purge gas flow to flow via the flow path S1 out of the bearing housing 37 and via an intermediary chamber 66 cut out between the outer surface 65 of the upper annular tube 50 into the inner region of the sectors 24 of the upper distribution element 15, in order to be discharged back from there into the interior of the reactor together with the particulate catalyst material. On the other hand, a gap 71 is formed between the stationary bearing housing 37 and the rotating annular element 59, which allows the purge gas flow to flow via the flow path S2 from the bearing housing 37 into the outer region of the sectors 24 of the upper distribution element 15.

LIST OF REFERENCE NUMBERS

10 Filling device
11 Feed hopper
12 upper inlet opening of the feed hopper
13 lower outlet opening of the feed hopper
14 Distribution device
15 First upper distribution element
16 Second central distribution element
17 Third lower distribution element
18 Outlet opening of the first upper distribution element
19 Outlet opening of the second central distribution element 20 Outlet opening of the third lower distribution element
21 vertical web of the first upper distribution element
22 vertical web of the second central distribution element
23 vertical web of the third lower distribution element
24 Sector of the first upper distribution element
25 Sector of the second central distribution element
26 Sector of the third lower distribution element
27 upper horizontal extension of the upper distribution element
28 central horizontal extension of the central distribution element
29 lower horizontal extension of the lower distribution element
30 upper vertical extension of the upper distribution element
31 central vertical extension of the central distribution element
32 lower vertical extension of the lower distribution element
33 Drive bearing
34 Drive device
35 Drive motor
36 Belt drive
36a Drive wheel
36b Drive belt
37 Bearing housing
37a Partial element of the bearing housing
38 Purge gas connection
39 Carrier plate
40 Inlet opening of the upper distribution element
41 Inlet opening of the central distribution element
42 Inlet opening of the lower distribution element
43 Upper deflection element
44 Central deflection element
45 Lower deflection element
46 Upper guide surface
47 Central guide surface
48 Lower guide surface
49 Annular insert
50 Upper annular tube
51 Central annular tube
52 Lower annular tube
53 Web between lower and central annular tube
54 Web between central and upper annular tube
55 Border of the upper annular tube
56 Fixed bearing ring
57 Rotating bearing ring
58 Annular element
59 Annular element
60 Ball bearing chamber
61 Ball bearing
62 upper sealing lip
63 lower sealing lip
64 Passage opening
65 Outer surface of the upper annular tube
66 Intermediary chamber
67 Base plate
68 Base opening
69 Guide ring
70 Shoulder
71 Gap
72 Annular diaphragm
73 Lug
A Rotation axis
h1 clear height of the first distribution element
h2 clear height of the first distribution element
h3 clear height of the third distribution element w1 clear width of the first distribution element
w2 clear width of the first distribution element
w3 clear width of the third distribution element
t1 vertical tangent
t2 horizontal tangent
S1 first purge gas flow
S2 second purge gas flow
r1 inner radius of the annular diaphragm
r2 outer radius of the annular diaphragm

The invention claimed is:

1. A filling device for dense loading of a chemical reactor with particulate catalyst material, comprising:
a feed hopper for particulate catalyst material, having an upper end provided with an upper inlet opening and a lower end provided with a lower outlet opening;
a distribution device that is arranged (i) below the feed hopper for distributing the particulate catalyst material in the chemical reactor by centrifugal force, and (ii) rotatably around a vertical rotation axis, wherein the distribution device comprises at least a first annular distribution element that has an upper, annular, substantially horizontal inlet opening with a clear width, a substantially vertical outlet opening directed radially outwards with respect to the rotation axis with a clear height, and a deflection element arranged between the inlet opening and the outlet opening, wherein the deflection element deflects a substantially vertical particle flow coming from the feed hopper into a substantially horizontal particle flow;
a drive bearing arranged radially symmetrically to the rotation axis, which has a fixed bearing ring directly or indirectly connected to the feed hopper and a rotating bearing ring connected to the distribution device; and
a drive device that has a drive motor arranged laterally offset from the vertical rotation axis outside the feed hopper, and a belt drive, wherein the drive motor drives the rotating bearing ring of the drive bearing via the belt drive;
wherein:
the clear height of the outlet opening is greater than the clear width of the inlet opening, and
the deflection element has a guide surface which has a substantially vertical tangent at the inlet opening and a substantially horizontal tangent at the outlet opening, where the radius of curvature of the guide surface increases continuously from the inlet opening to the outlet opening.

2. The filling device according to claim 1, wherein:
the drive bearing is arranged within a peripheral bearing housing;
the peripheral bearing housing can be supplied with a purge gas flow;
the drive motor and the drive bearing are fastened to a radial carrier plate arranged between the feed hopper and the distribution device;
the radial carrier plate forms an upper side of the peripheral bearing housing;
the fixed bearing ring of the drive bearing is connected to the radial carrier plate; and
passage openings for the purge gas are provided between the radial carrier plate and the fixed bearing ring.

3. The filling device according to claim 2, wherein purge gas is at least partially discharged from the peripheral bearing housing into the particle flow inside the filling device.

4. The filling device according to claim 2, wherein the purge gas is discharged into the particle flow via an intermediary chamber formed between the rotating bearing ring of the drive bearing and at least one annular insert, or wherein the drive bearing comprises a ball bearing.

5. The filling device according to claim 2, wherein the drive motor is fixed on the radial carrier plate so as to be radially displaceable relative to the vertical rotation axis.

6. The filling device according to claim 1, wherein the lower end of the feed hopper has at least one annular insert which feeds the particle flow at least to the first annular distribution element.

7. The filling device according to claim 6, wherein the at least one annular insert consists of at least one concentric, annular tube arranged radially symmetrically around the rotation axis, which in each case supplies a partial flow of the particle flow to an allocated distribution element.

8. The filling device according to claim 1, wherein the clear height of the outlet opening is at least 1.25 times greater than the clear width of the inlet opening.

9. The filling device according to claim 1, wherein the guide surface is designed as a clothoidal transition surface.

10. A method for dense loading of a chemical reactor with particulate catalyst material, comprising the steps of:

supplying a particulate catalyst material to a filling device according to claim 1; and distributing the supplied particulate catalyst material in the chemical reactor with the filling device.

11. A filling device for dense loading of a chemical reactor with particulate catalyst material, comprising:

a feed hopper for particulate catalyst material, having an upper end provided with an upper inlet opening and a lower end provided with a lower outlet opening;

a distribution device that is arranged (i) below the feed hopper for distributing the particulate catalyst material in the chemical reactor by centrifugal force, and (ii) rotatably around a vertical rotation axis, wherein the distribution device comprises at least a first annular distribution element that has an upper, annular, substantially horizontal inlet opening with a clear width, a substantially vertical outlet opening directed radially outwards with respect to the rotation axis with a clear height, and a deflection element arranged between the inlet opening and the outlet opening, wherein the deflection element deflects a substantially vertical particle flow coming from the feed hopper into a substantially horizontal particle flow;

a drive bearing arranged radially symmetrically to the rotation axis, which has a fixed bearing ring directly or indirectly connected to the feed hopper and a rotating bearing ring connected to the distribution device; and a drive device that has a drive motor arranged laterally offset from the vertical rotation axis outside the feed hopper, and a belt drive, wherein the drive motor drives the rotating bearing ring of the drive bearing via the belt drive;

wherein:

the drive bearing is arranged inside a peripheral bearing housing;

the peripheral bearing housing can be supplied with a purge gas flow;

the drive motor and the drive bearing are fastened to a radial carrier plate arranged between the feed hopper and the distribution device;

the radial carrier plate forms an upper side of the peripheral bearing housing;

the fixed bearing ring of the drive bearing is connected to the radial carrier plate; and passage openings for the purge gas are provided between the radial carrier plate and the fixed bearing ring.

12. The filling device according to claim 11, wherein:

the clear height of the outlet opening is greater than the clear width of the inlet opening; and the deflection element has a guide surface which has a substantially vertical tangent at the inlet opening and a substantially horizontal tangent at the outlet opening, where the radius of curvature of the guide surface increases continuously from the inlet opening to the outlet opening.

13. The filling device according to claim 11, wherein the lower end of the feed hopper has at least one annular insert, which feeds the particle flow at least to the first distribution element.

14. The filling device according to claim 11, wherein purge gas is at least partially discharged from the peripheral bearing housing into the particle flow inside the filling device.

15. The filling device according to claim 11, wherein the purge gas is discharged into the particle flow via an intermediary chamber formed between the rotating bearing ring of the drive bearing and at least one annular insert, or wherein the drive bearing comprises a ball bearing.

16. The filling device according to claim 11, wherein the drive motor is fixed on the radial carrier plate so as to be radially displaceable relative to the vertical rotation axis.

17. A method for dense loading of a chemical reactor with particulate catalyst material, comprising the steps of:

supplying a particulate catalyst material to a filling device according to claim 11; and distributing the supplied particulate catalyst material in the chemical reactor with the filling device.

18. A filling device for dense loading of a chemical reactor with particulate catalyst material, comprising:

a feed hopper for particulate catalyst material, having an upper end provided with an upper inlet opening and a lower end provided with a lower outlet opening;

a distribution device that is arranged (i) below the feed hopper for distributing the particulate catalyst material in the chemical reactor by centrifugal force, and (ii) rotatably around a vertical rotation axis, wherein the distribution device comprises at least a first annular distribution element that has an upper, annular, substantially horizontal inlet opening with a clear width, a substantially vertical outlet opening directed radially outwards with respect to the rotation axis with a clear height, and a deflection element arranged between the inlet opening and the outlet opening, wherein the deflection element deflects a substantially vertical particle flow coming from the feed hopper into a substantially horizontal particle flow;

a drive bearing arranged radially symmetrically to the rotation axis, which has a fixed bearing ring directly or indirectly connected to the feed hopper and a rotating bearing ring connected to the distribution device; and a drive device that has a drive motor arranged laterally offset from the vertical rotation axis outside the feed hopper, and a belt drive, wherein the drive motor drives the rotating bearing ring of the drive bearing via the belt drive;

wherein:

the lower end of the feed hopper has at least one annular insert, which feeds the particle flow at least to the first annular distribution element; and the at least one annular insert consists of at least one concentric, annular tube arranged radially symmetrically around the rotation axis, which in each case supplies a partial flow of the particle flow to an allocated distribution element.

19. The filling device according to claim 18, wherein:

the clear height of the outlet opening is greater than the clear width of the inlet opening; and the deflection element has a guide surface which has a substantially vertical tangent at the inlet opening and a substantially horizontal tangent at the outlet opening, where the radius of curvature of the guide surface increases continuously from the inlet opening to the outlet opening.

20. The filling device according to claim 18, wherein the drive bearing is arranged inside a peripheral bearing housing, wherein the peripheral bearing housing can be supplied with a purge gas flow, wherein the drive motor and the drive bearing are fastened to a radial carrier plate arranged between the feed hopper and the distribution device, wherein the radial carrier plate forms an upper side of the peripheral bearing housing and wherein the fixed bearing ring of the drive bearing is connected to the radial carrier plate, wherein passage openings for the purge gas are provided between the radial carrier plate and the fixed bearing ring.

21. The filling device according to claim 20, wherein purge gas is at least partially discharged from the peripheral bearing housing into the particle flow inside the filling device.

22. The filling device according to claim 20, wherein purge gas is discharged into the particle flow via an intermediary chamber formed between the rotating bearing ring of the drive bearing and the at least one annular insert, or wherein the drive bearing comprises a ball bearing.

23. The filling device according to claim 20, wherein the drive motor is fixed on the radial carrier plate so as to be radially displaceable relative to the vertical rotation axis.

24. The filling device according to claim 18, wherein the distribution device has a central distribution element with a central circular inlet opening and a central deflection element.

25. The filling device according to claim 18, wherein the at least one distribution element has a plurality of vertical, spaced-apart and radially outwardly extending rigid webs distributed over its periphery, which divide the distribution element into a plurality of radially symmetrical sectors.

26. The filling device according to claim 25, wherein elastic vertical extensions are provided, which extend radially outwards at the end of each of the vertical, spaced-apart and radially outwardly extending rigid webs.

27. The filling device according to claim 18, wherein the at least one distribution element has on its lower edge a peripheral, one-piece, horizontal elastic extension extending radially outwards from the outlet opening.

28. The filling device according to claim 27, wherein the horizontal extension has a radius which increases continuously over its circumference or over at least one circular segment.

29. A method for dense loading of a chemical reactor with particulate catalyst material, comprising the steps of:

supplying a particulate catalyst material to a filling device according to claim 18; and distributing the supplied particulate catalyst material in the chemical reactor with the filling device.

* * * * *